US010866368B2

(12) United States Patent
Tovey

(10) Patent No.: US 10,866,368 B2
(45) Date of Patent: Dec. 15, 2020

(54) APPARATUS FOR PROCESSING A FERRULE AND ASSOCIATED METHOD

(71) Applicant: CORNING INCORPORATED, Corning, NY (US)

(72) Inventor: Cameron John Tovey, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/549,233

(22) Filed: Aug. 23, 2019

(65) Prior Publication Data

US 2020/0073058 A1  Mar. 5, 2020

Related U.S. Application Data

(60) Provisional application No. 62/725,595, filed on Aug. 31, 2018.

(51) Int. Cl.
*G02B 6/38* (2006.01)
*B24B 19/22* (2006.01)

(52) U.S. Cl.
CPC .......... *G02B 6/3863* (2013.01); *B24B 19/226* (2013.01); *G02B 6/381* (2013.01); *G02B 6/385* (2013.01); *G02B 6/3874* (2013.01); *G02B 6/3882* (2013.01)

(58) Field of Classification Search
CPC ...... G02B 6/381; G02B 6/3863; B24B 19/226
See application file for complete search history.

(56) References Cited

U.S. PATENT DOCUMENTS

| 4,831,784 | A |   | 5/1989 | Takahashi |
| 4,979,334 | A | * | 12/1990 | Takahashi ............. B24B 19/226 451/271 |
| 5,107,627 | A | * | 4/1992 | Mock, Jr. ............. B24B 19/226 451/271 |

(Continued)

FOREIGN PATENT DOCUMENTS

EP  231397 A1  8/1987

OTHER PUBLICATIONS

Tovey; "Method of Processing a Ferrule and Apparatus for Carrying Out the Method" Filed As U.S. Appl. No. 16/451,463 on June 25, 2019; 41 pages—Listed in ID and App As U.S. Appl. No. 62/692,642 ID29372.

(Continued)

*Primary Examiner* — Daniel Petkovsek
(74) *Attorney, Agent, or Firm* — Kapil U. Banakar

(57) ABSTRACT

An apparatus for processing a ferrule with an abrasive element. The apparatus includes a first mount to which the ferrule is secured, a second mount to which the abrasive element is secured, and a controller operatively coupled to at least the second mount. The second mount includes a spindle to which the abrasive element is coupled, with the spindle having a central axis about which the spindle is configured to rotate. At least one of the first or second mounts is movable within a plane such that when the ferrule and the abrasive element are brought into contact with each other, the apparatus provides three degrees of freedom of movement for processing the ferrule with the abrasive element. A method of using the apparatus to process a ferrule is also disclosed.

15 Claims, 10 Drawing Sheets

(56) References Cited

U.S. PATENT DOCUMENTS

| | | | |
|---|---|---|---|
| 5,184,433 A | 2/1993 | Maack | |
| 5,458,528 A * | 10/1995 | Lurie | B24B 19/226 |
| | | | 451/41 |
| 5,463,709 A * | 10/1995 | Terao | B24B 19/226 |
| | | | 385/77 |
| 5,559,916 A * | 9/1996 | Terao | B24B 19/226 |
| | | | 385/147 |
| 5,720,653 A * | 2/1998 | Miller | B24B 19/226 |
| | | | 451/278 |
| 5,947,797 A | 9/1999 | Buzzetti | |
| 6,183,343 B1 | 2/2001 | Buzzetti | |
| 6,190,239 B1 | 2/2001 | Buzzetti | |
| 6,877,909 B2 * | 4/2005 | Fleenor | B24B 19/226 |
| | | | 385/78 |
| 7,217,174 B1 * | 5/2007 | Medeiros | B24B 19/226 |
| | | | 451/271 |
| 2003/0036342 A1 * | 2/2003 | Yamada | B24B 19/226 |
| | | | 451/66 |
| 2020/0003962 A1 * | 1/2020 | Tovey | G02B 6/3863 |

OTHER PUBLICATIONS

International Search Report and Written Opinion of the European International Searching Authority; PCT/US2019/048079; dated Dec. 16, 2019; 12 Pgs.

\* cited by examiner

APPARATUS FOR PROCESSING A FERRULE AND ASSOCIATED METHOD

PRIORITY APPLICATION

This application claims the benefit of priority of U.S. Provisional Application No. 62/725,595, filed on Aug. 31, 2018, the content of which is relied upon and incorporated herein by reference in its entirety.

TECHNICAL FIELD

This disclosure relates generally to optical connectivity, and more particularly to an apparatus for processing a ferrule for optical fiber applications and an associated method for processing ferrules.

BACKGROUND

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" fiber optic connector).

Regardless of where installation occurs, a fiber optic connector typically includes a ferrule with one or more bores that receive one or more optical fibers. The ferrule supports and positions the optical fiber(s) with respect to a housing of the fiber optic connector. Thus, when the housing of the fiber optic connector is mated with another connector (e.g., in an adapter), an optical fiber in the ferrule is positioned in a known, fixed location relative to the housing. This allows an optical connection to be established when the optical fiber is aligned with another optical fiber provided in the mating connector.

The assembly of connectors involve several steps, including the end preparation of the optical fibers to be connectorized. In general, end preparation involves four main processing steps: (1) stripping the polymer coating to expose a select length of the bare glass fiber; (2) precision cleaving the base glass fiber section with controlled end angles and surface quality; (3) inserting the optical fiber in a ferrule of the connector to have a controlled protrusion distance from the ferrule; and (4) polishing the end of the optical fiber that protrudes from the ferrule. The precision cleaving step may take place before or after inserting the optical fiber in the ferrule. The polishing step aids in removing certain defects from the end face of the optical fiber as well as the end face of the ferrule, such as scratches, pits, digs, as well as adhesives and contaminates, to provide a clean, well-defined mating interface.

The fiber and ferrule end faces are generally flush with each other and in many cases the ferrule end face has a domed geometry with the dome apex intended to be at the center of the optical fiber. Such domed geometry is often referred to as a "physical contact" geometry, and it may be a result of polishing the end face of the ferrule prior to inserting the optical fiber, polishing fiber and ferrule end faces together (e.g., after inserting the optical fiber into the ferrule and securing it relative to the ferrule), or some combination of these approaches. The ferrule, for example, may be polished from every direction equally so that the end face of the ferrule generally has the domed geometry before inserting the optical fiber.

Regardless of the approach, it is important that the polishing step of the connectorization process maintains/achieves the desired precise geometry of the ferrule/fiber end faces. Indeed, in many cases, the fiber and ferrule end faces must conform to relevant industry standards that specify requirements for apex offset (AO), radius of curvature (ROC), and fiber height for different physical contact geometries. Examples of physical contact geometries known in the industry include, but are not limited to, physical contact (PC), angled physical contact (APC), and ultra physical contact (UPC) geometries. Thus, the challenge is to polish down the protrusion of the optical fiber from the ferrule end face to an acceptable height (e.g., within 50 microns of the ferrule end face) and to polish out defects in the optical fiber and ferrule in a manner that does not alter the end face geometries (e.g., the radius of curvature in the case of a domed end face) or the position of the apex. In conventional approaches, this is achieved by engaging the ferrule/fiber end faces with an abrasive element, which may take the form of an abrasive sheet or film, or an abrasive slurry. In order to maintain the end face geometry during the polishing step, it is desirable to polish the ferrule/fiber end faces equally from every direction.

Several approaches have been developed to ensure that polishing occurs equally from every direction. These approaches typically include moving the ferrule/fiber assembly relative to the abrasive element in a certain pattern. By way of example, a circular pattern is often used to polish the ferrule/fiber end faces. Thus, for example, if the abrasive element is fixed in position and the ferrule/fiber assembly is moved along a circular path, then the direction of polish, which is tangent to the circular motion, goes through every direction equally and the geometry of the ferrule/fiber end faces is maintained. A figure-8 polishing pattern may also be used to polish the ferrule/fiber end faces equally from every direction and thereby maintain precise end face geometry.

During the polishing process, the abrasive particles used on the abrasive element become dislodged from its surface while glass and ceramic (e.g., the material of the optical fiber and the ferrule) become deposited on the abrasive element. Thus, after some use of the circular path the abrasive element becomes worn and using the same circular path on subsequent ferrule/fiber assemblies may impact the quality of the polishing step and introduce unwanted geometric variations. Accordingly, new abrasive elements may have to be introduced for subsequent assemblies. The abrasive elements, including commercially available abrasive sheets or films, are expensive and the efficient use of the abrasive elements is desired in order to reduce processing costs.

One prior attempt to resolve this issue includes introducing an axis of motion to move the center of the circular pattern or figure 8 pattern in a specified direction. By way of example, a polishing apparatus may be configured to fix the ferrule/fiber assembly and then provide the abrasive element on a platen that is movable within a plane (e.g., an x-y plane), such as by a suitable frame having an x-stage and y-stage for moving the platen in two orthogonal directions. In this regard, U.S. Pat. No. 5,947,797 discloses such a polishing apparatus for producing a figure 8 trace pattern that translates along a linear axis. While such solutions provide improved usage of the abrasive element, the translational movement produces non-uniformities in the trace patterns on the abrasive element. More particularly, the resulting trace patterns will have regions of under-usage of the abrasive element and regions of over-usage of the abrasive element, where, for example, the trace paths cross each other multiple times, leading to wear and uneven material removal during the polishing process. This non-uniformity can lead to undesired changes to the end face geometries of the ferrule and optical fiber, as well as undesirable defects like scratches, etc. and therefore should be avoided.

Another shortcoming of existing polishing apparatuses is the speed at which the ferrule/fiber assemblies may be processed. More particularly, from a manufacturing standpoint, it is desirable to polish the ferrule/fiber assemblies as quickly as possible so as to maximize the production rate of the polished components. The speed at which the ferrule/fiber assemblies may be processed may be limited by the speed at which the platen (which carries the abrasive element) may be moved within the x-y plane to generate the desired trace pattern on the abrasive element. The movement in the x-y plane may be achieved by suitable motors or actuators associated with the x and y stages. To move the platen at a relatively high rate of speed requires that the motors be relatively large and capable of generating the necessary forces to achieve the desired motion. However, the large mass associated with the platen and the speeds at which it is desired to move the platen within the x-y plane results in a dynamic system that is subject to vibrations (e.g., from weight imbalances) and other dynamic effects. In this regard, as the speed in increased, a value may be reached at which the apparatus starts to vibrate, shake, knock or rattle and these disturbances will likely increase in amplitude with a further increase in speed. Of course, these vibrations have a negative impact of the quality of the polish and this effectively operates as a practical limit on how fast the ferrule/fiber assemblies may be processed by the apparatus.

Attempts have been made to address the vibrations associated with the moving platen in order to exceed this practical limit in processing speed. For example, one approach is to use various counterbalance measures, such as counter weights, that when included in the dynamic system, minimize the vibrations as the processing speeds increase. Such counterbalance measures, however, are expensive and often provide limited effectiveness and improvement to the production rates.

Accordingly, manufacturers continue to strive for an improved apparatus for polishing ferrule/fiber assemblies that maintains end face geometries by polishing equally from every direction, provides an efficient and uniform use of the abrasive element, and that provides increased production rates in a reliable and cost-effective manner.

SUMMARY

To address these and other shortcomings, an apparatus for processing a ferrule with an abrasive element is provided. The apparatus includes a first mount to which the ferrule is configured to be secured, a second mount to which the abrasive element is configured to be secured, and a controller operatively coupled to at least the second mount. The second mount includes an abrasive mount spindle to which the abrasive element is configured to be coupled. The abrasive mount spindle has a central axis about which the abrasive mount spindle is configured to rotate. At least one of the first or second mounts is movable within a plane such that when the ferrule and the abrasive element are brought into contact with each other, the apparatus provides three degrees of freedom of movement for processing the ferrule with the abrasive element.

In one embodiment, the first mount may be stationary and the second mount provides the three degrees of freedom of movement for processing the ferrule with the abrasive element. In this regard, the second mount may include a frame movable in at least two directions, wherein the abrasive mount spindle is mounted to the frame, and wherein the controller is operatively coupled to the frame and configured to move the abrasive mount spindle within the plane. In one embodiment, the controller may be configured to actuate the frame in a manner that causes the central axis of the abrasive mount spindle to revolve around (i.e. rotate about) the ferrule during operation of the apparatus. More particularly, the controller may be configured to actuate the frame so that the central axis of the abrasive mount spindle moves around the ferrule in a spiral path. To this end, the frame may include an x-stage for moving the abrasive mount spindle in an x-direction and a y-stage for moving the abrasive mount spindle in a y-direction. In this embodiment, the controller may be configured to rotate the abrasive mount spindle about its central axis at an angular velocity greater than an angular velocity at which the abrasive mount spindle revolves around the ferrule.

In one embodiment, the first mount may be movable and is configured to provide at least one degree of freedom of movement for processing the ferrule with the abrasive element. In this regard, the first mount may include a ferrule spindle to which the ferrule may be configured to be coupled. The ferrule spindle has a ferrule spindle axis about with the ferrule spindle is configured to rotate. The controller may be configured to rotate the abrasive mount spindle on the second mount about its central axis at an angular velocity greater than an angular velocity at which the ferrule spindle on the first mount rotates about the ferrule spindle axis. In this embodiment, the second mount may include a frame movable along a translation axis, wherein the controller is operatively coupled to the frame and configured to move the abrasive element along the translation axis.

In a further embodiment, the first mount may be configured to provide two degrees of freedom of movement for processing the ferrule with the abrasive element. In this regard, the first mount may include a frame movable in at least two directions, wherein the controller is operatively coupled to the frame and configured to move the ferrule within the plane. In the embodiment where the first mount includes a ferrule spindle, the first mount may additionally include a frame movable along a translation axis, wherein the controller is operatively coupled to the frame and configured to move the ferrule within the plane along the translation axis.

In these embodiments, the controller may be configured to cause relative movement between the first and second mounts such that engagement of the ferrule with the abrasive element during the relative movement traces a spiral path on the abrasive element. In one embodiment, the spiral path defines an Archimedean spiral.

In some embodiments, the ferrule may be part of a respective ferrule assembly that also includes at least one optical fiber. In other words, in some embodiments, the ferrule assembly includes the ferrule referred to above and at least one optical fiber coupled to the ferrule. Thus, in such embodiment, the apparatus is configured for processing the ferrule assembly with the abrasive element.

A method of processing a ferrule having an end face is also provided. The method includes engaging the ferrule and an abrasive element with each other at the end face, rotating the abrasive element about a central axis, and moving at least one of the ferrule or the abrasive element relative to the other within a plane to provide three degrees of freedom of movement for processing the ferrule with the abrasive element.

In one embodiment, the method includes holding the ferrule stationary and moving the abrasive element relative to the ferrule within the plane. In this regard, a spindle may provide the rotation of the abrasive element about the central axis, and the moving step further includes moving the spindle within the plane. Moreover, in one embodiment, moving the abrasive element relative to the ferrule may further include revolving the central axis around the ferrule. In this regard, revolving the central axis around the ferrule may further include moving the central axis around the ferrule in a spiral path. The method may further include rotating the abrasive element about the central axis at an angular velocity greater than an angular velocity at which the central axis revolves around the ferrule.

In one embodiment, the method includes moving the ferrule to provide at least one degree of freedom of movement for processing the ferrule with the abrasive element. In this regard, the method may include rotating the ferrule about a ferrule spindle axis, wherein the ferrule is coupled to a ferrule spindle that defines the ferrule spindle axis. In this embodiment, the abrasive element may be rotated about its central axis at an angular velocity greater than an angular velocity at which the ferrule rotates about the ferrule spindle axis. The method further includes moving the abrasive element along a translation axis.

In another embodiment, the method includes moving the ferrule to provide two degrees of freedom of movement for processing the ferrule with the abrasive element. For example, the ferrule may be moved within a plane to provide two degrees of freedom of movement. Alternatively, when the ferrule is being rotated about the ferrule spindle axis, the method may include moving the ferrule along a translation axis.

The method further comprises tracing a spiral path in the abrasive element due to the relative movement between the ferrule and the abrasive element. In one embodiment, tracing the spiral path in the abrasive element further includes tracing the spiral path of an Archimedean spiral, wherein successive passes of the spiral path are radially shifted from each other by a substantially constant distance.

In some embodiments, the ferrule may be part of a respective ferrule assembly that also includes at least one optical fiber. In these embodiments, the engaging and moving steps described above are performed with the ferrule assembly. For example, the end face of the ferrule and an end of the at least one optical fiber may define a mating interface of the corresponding ferrule assembly. The engaging step may then comprise engaging the ferrule assembly and the abrasive element with each other at the mating interface.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
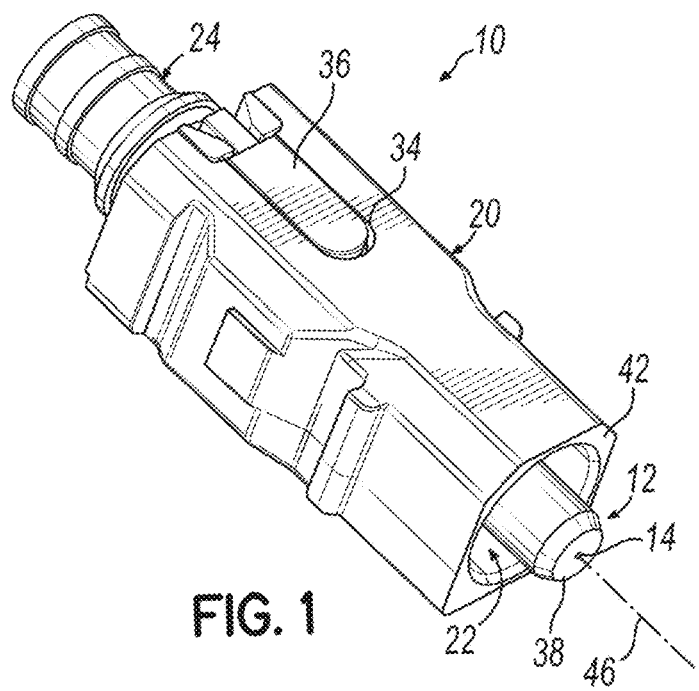
FIG. 1 is a perspective view of a fiber optic connector.

Various embodiments will be further clarified by examples in the description below. In general, the description relates to processing ferrules, such as those used in fiber optic connectors and fiber optic cable assemblies including the same. One example of a fiber optic connector 10 (also referred to as "optical connector 10", or simply "connector 10") is shown in FIG. 1. Although the connector 10 is shown in the form of a SC-type connector, the features described below may be applicable to different connector designs. This includes ST, LC, and MU-type connectors, for example, and other single-fiber or multi-fiber connector designs.

Figure 2:
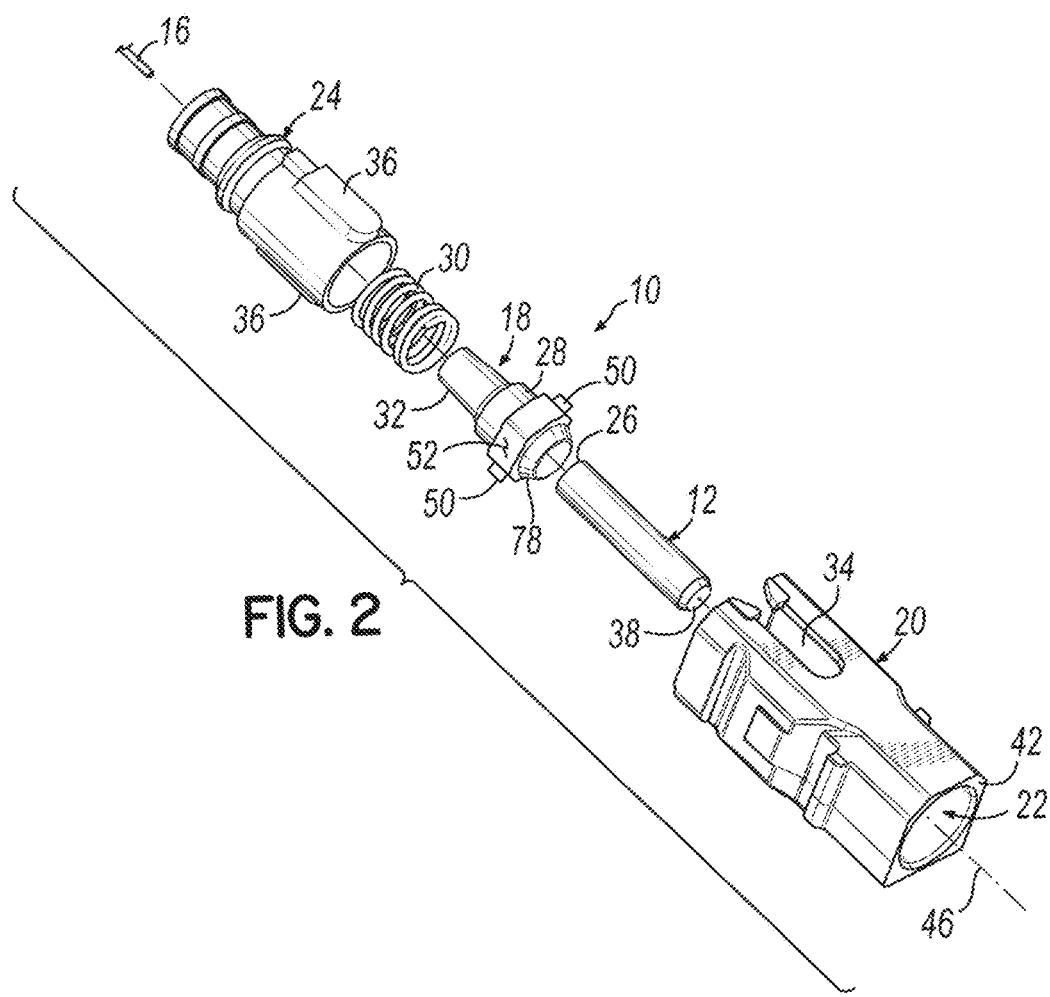
FIG. 2 is an exploded perspective view of the fiber optic connector shown in FIG. 1.

As shown in FIGS. 1 and 2, the connector 10 includes a ferrule 12 having a ferrule bore 14 ("micro-hole") configured to support an optical fiber 16, a ferrule holder 18 from which the ferrule 12 extends, a housing 20 having a cavity 22 in which the ferrule holder 18 is received, and a connector body 24 (also referred to as "inner housing 24", "retention body 24", or "crimp body 24") configured to retain the ferrule holder 18 within the housing 20. More specifically, a back end 26 of the ferrule 12 is received in a first portion 28 of the ferrule holder 18 and is secured therein in a known manner (e.g., press-fit, adhesive, molding the ferrule holder 18 over the back end 26 of the ferrule 12, etc.). The ferrule 12 and ferrule holder 18 may even be a monolithic structure in some embodiments.

The ferrule holder 18 is biased to a forward position within the housing 20 by a spring 30, which extends over a second portion 32 of the ferrule holder 18 that has a reduced cross-sectional diameter/width compared to the first portion 28. The spring 30 also interacts with internal geometry of the connector body 24, which may be secured to the housing 20 using a snap-fit or the like. For example, FIGS. 1 and 2 illustrate a rear portion of the housing 20 having cut-outs or slots 34 on opposite sides so as to define a split shroud. The connector body 24 has tabs 36 configured to be snapped into the slots 34 and retained therein due to the geometries of the components.

Figure 3:
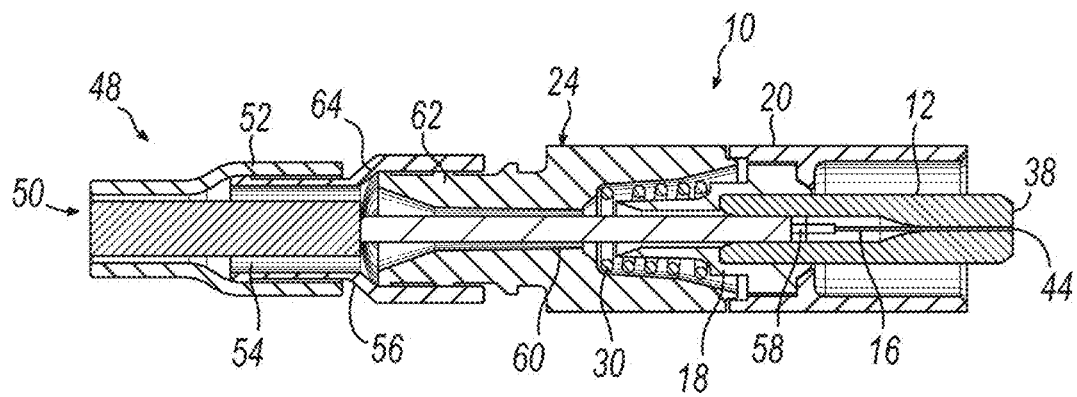
FIG. 3 is a cross-sectional view of the fiber optic connector of FIG. 1 installed on a fiber optic cable.

When the connector 10 is assembled as shown in FIG. 1, a front end 38 of the ferrule 12 ("ferrule end face 40") projects beyond a front end 42 of the housing 20. The ferrule end face 40 presents the optical fiber 16 ("fiber end 44") for optical coupling with a mating component (e.g., another fiber optic connector; not shown). Note that the ferrule 12 aligns the optical fiber 16 along a longitudinal axis 46. These aspects can be better appreciated with reference to FIG. 3, which shows how a fiber optic cable 48 (hereinafter "cable 48") including the optical fiber 16 can be terminated with the connector 10. In other words, the connector 10 can be installed on the cable 48 to form a fiber optic cable assembly 50. The cable 48 is merely an example to facilitate discussion. In the embodiment shown, the fiber cable 48 includes an outer jacket 52, inner jacket 54, strength members 56 in the form of aramid yarn, and the optical fiber 16, which itself has a coating 58 and a buffer layer 60 ("tight buffer"). Portions of the outer jacket 52 and inner jacket 54 have been removed from the optical fiber 16 to expose the strength members 56, which are cut to a desired length and placed over a rear portion 62 of the connector body 24. The strength members 56 are coupled to the connector body 24 by a crimp band 64 (also referred to as "crimp ring") that has been positioned over the optical fiber 16 and a portion of the strength members 56 and inner jacket 54. Again, the cable 48 is merely an example, as persons skilled in optical connectivity will appreciate how different cable designs may be terminated with the connector 10.

Figure 4A:
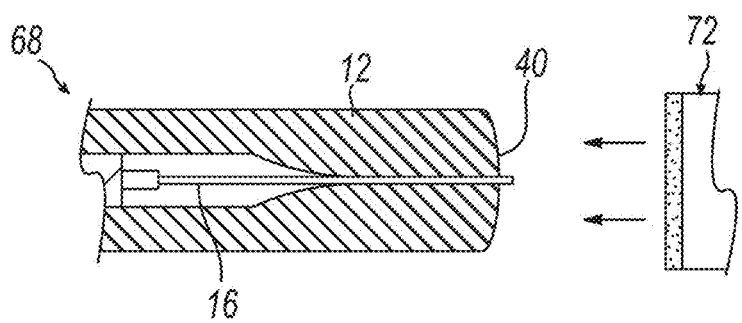
FIGS. 4A and 4B schematically illustrate a ferrule and optical fiber coupled together and being polished by an abrasive element at a mating interface.
Figure 4B:
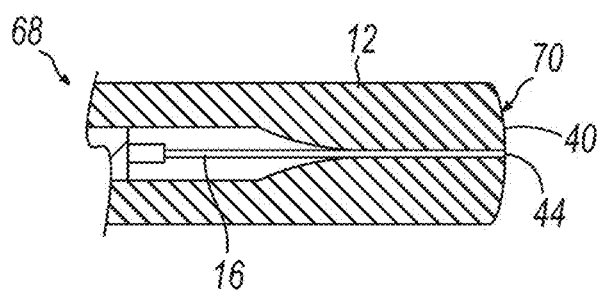

During the formation of the connector 10, the optical fiber 16 may be coupled to the ferrule 12 (e.g., secured to the ferrule bore 14 using an adhesive) in the connectorization process to provide a ferrule assembly 68. As used herein and illustrated in FIGS. 4A and 4B, a ferrule assembly 68 includes the ferrule 12 and the optical fiber 16 coupled together. The ferrule end face 40 and a front end of the optical fiber 16 ("fiber end 44") together define a mating interface 70 ("interface 70"). In one embodiment, the mating interface 70 may be generally domed shaped with the optical fiber 16 positioned at or substantially at (i.e., within 50 microns of) the apex of the dome. Other geometries, however, may also be possible. During the connectorization process the optical fiber 16 may have a small protrusion that extends beyond the ferrule end face 40 (FIG. 4A). The interface 70 is then polished with an abrasive element 72 to remove the protrusion so that the fiber end 44 is substantially flush with (i.e., within 50 microns of) the ferrule end face 40 (FIG. 4B). Additionally, polishing also helps remove adhesive and defects that may exist on the interface 70.

Applicant's prior application entitled "Method of Processing a Ferrule And Apparatus for Carrying out the Method," filed on Jun. 29, 2018 and having U.S. Provisional Application Ser. No. 62/692,642, the disclosure of which is incorporated by reference herein in its entirety, disclosed a method for processing the ferrule 12 to provide a desired geometry. The ferrule 12 may be processed prior to inserting and securing the optic fiber 16, after inserting and securing the optical fiber 16 (such that the processing is of the ferrule assembly 68), or by a combination of these approaches. In some embodiments where the ferrule assembly 68 is processed, the processing may even occur when the ferrule assembly 68 is supported by the connector body 24 (and thereby assembled as part of the connector 10). For convenience, the description below will refer to processing the ferrule assembly 68. It will be appreciated, however, that the same processing may be performed with respect to the ferrule 12 without the optical fiber 16. Regardless of the approach, the ferrule 12 is processed in a manner that provides engagement between the ferrule end face 42 (or interface 70 for the ferrule assembly 68) and an abrasive element 72 substantially equally from every direction to maintain/achieve geometry (e.g., domed shape with the optical fiber at the apex of the dome). Additionally, the efficient use of the abrasive element 72 reduces the overall processing costs associated with the ferrule assembly 68. In the prior application, these goals were achieved by moving the ferrule assembly 68 and abrasive element 72 relative to each other so as to trace a spiral path 74 in the abrasive element 72.

Figure 5:
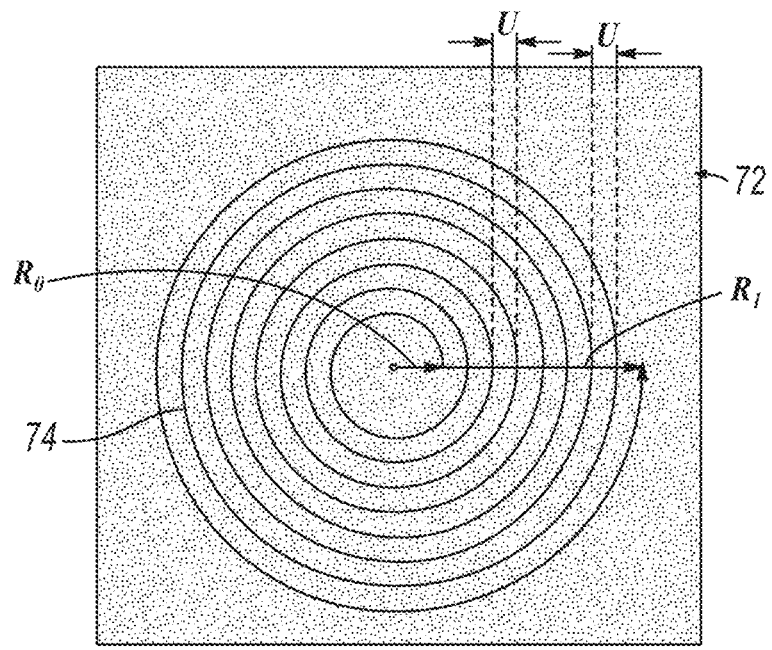
FIG. 5 is a top plan view of an Archimedean spiral traced on an abrasive element.

FIG. 5 illustrates an exemplary spiral path 74 formed in the abrasive element 72 due to the relative movement between the ferrule assembly 68 and the abrasive element 72. As explained in the prior application, for manufacturing purposes it may be preferred that an Archimedean spiral path be traced in the abrasive element 72. One revolution along the spiral path 74 defines a pass of the spiral and effectively produces a direction of engagement (e.g., an abrading direction) between the interface 70 and the abrasive element 72 substantially equally from every circumferential direction (e.g., each angle in the full 360°). Additional revolutions around the spiral path 74 (i.e., passes) repeat the processing of the interface 70. In this way, due to the interaction between the interface 70 and the abrasive element 72, material may be removed from the interface 70 in a substantially symmetric fashion such that the geometry of the interface 70 and the relative position of the optical fiber 16 at the interface 70 are maintained/achieved. Additionally, the spiral path 74 utilizes the area of the abrasive element 72 in a very efficient manner. While the spacing between successive passes of the spiral path 74 in FIG. 5 have been exaggerated for purposes of illustration, the distance between successive passes of the spiral path 74 may be quite small such that there is relatively little, if any, void space (area over which the interface 70 has not passed over) on the abrasive element 72. Furthermore, it is noteworthy that the spiral path 74 may not cross itself at various points or regions. Accordingly, variations that might result from passing the interface 70 over regions of the abrasive element 72 that were previously used may be avoided and more consistent output may be achieved.

Applicant's prior application further disclosed an apparatus 78 for generating the relative movement between the ferrule assembly 68 and the abrasive element 72 to generate the spiral path 74. As mentioned above, the ferrule 12 may be processed by itself (i.e., before inserting and securing the optical fiber 16) and/or as part of the ferrule assembly 68 (i.e., after inserting and securing the optical fiber 16 in the ferrule 12). Thus, although the apparatus 78 as well as the other apparatuses discussed below are described with reference to processing the ferrule assembly 68, the disclosure may apply equally to situations where the ferrule 12 is at least partially processed separately from the optical fiber.

Figure 6:
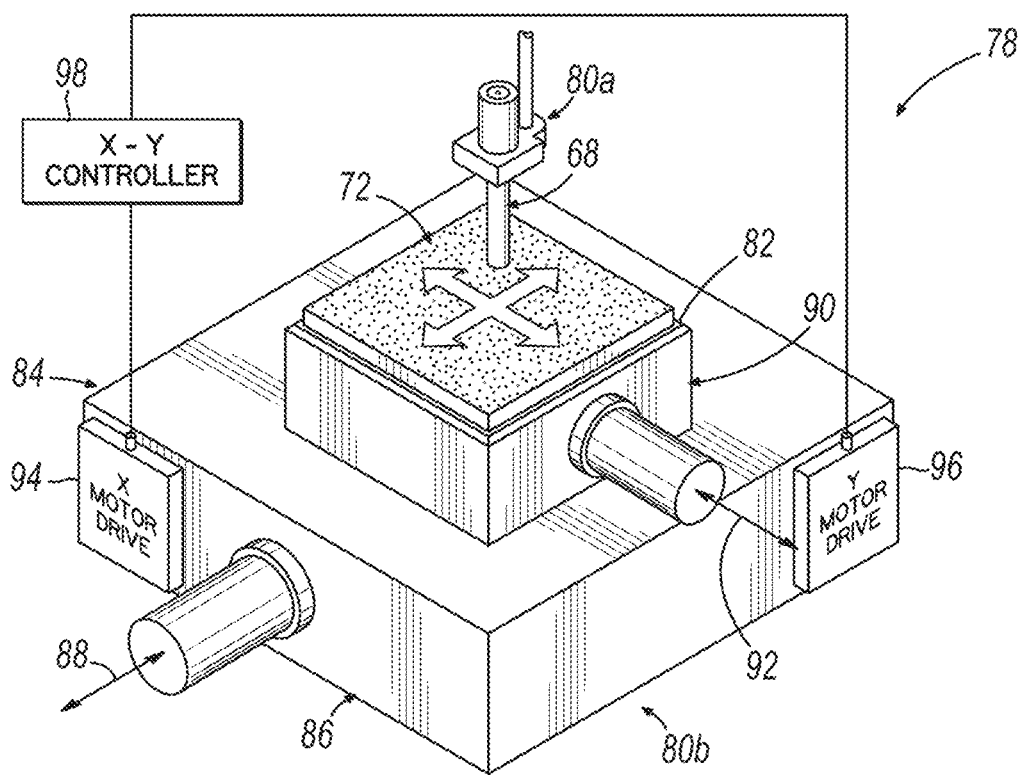
FIG. 6 schematically illustrates an apparatus for moving a ferrule assembly relative to an abrasive element to trace a spiral path on the abrasive element.

The apparatus from the prior application is reproduced in FIG. 6 for completeness and discussion purposes. In this regard, the apparatus 78 may be configured such that the ferrule assembly 68 is stationary while the abrasive element 72 is moved in an x-y plane to generate the spiral path 74. In the embodiment shown, the ferrule assembly 68 is secured to a first mount 80a and the abrasive element 72 is secured to a second mount 80b. The second mount 80b includes a holding plate 82 having an upper surface configured to receive the abrasive element 72, which may take the form of an abrasive sheet or film. The second mount 80b is configured to be movable. In this regard, the holding plate 82 may be mounted to a multi-axis frame 84 having an x-stage 86 for moving the holding plate 82 in a direction defined by an x-axis 88 and a y-stage 90 for moving the holding plate 82 in a direction defined by a y-axis 92. The x-stage 86 includes a motor drive 94 for controlling an actuator (not shown) for moving the x-stage 86 along the x-axis 88 (i.e., in an x-direction). The y-stage 90 similarly includes a motor drive 96 for controlling an actuator for moving the y-stage 90 along the y-axis 92 (i.e., in a y-direction). The apparatus 78 thus provides for two degrees of freedom for moving the abrasive element 72 in the x-y plane in order to polish the interface 70 of the ferrule assembly 68 with the abrasive element 72. The motor drives 94, 96 may be operatively coupled to a controller 98 for controlling the position of the abrasive element 72 relative to the ferrule assembly 68. The controller 98 may include a processor and a memory for storing data.

The controller 98 may further include an input interface configured to receive input from a technician or the like, for example, for carrying out the processing (e.g., polishing) of the interface 70 of the ferrule assembly 68 by the apparatus 78. By way of example, the starting radius $R_0$, radial feed rate U, abrading distance D, and abrading speed V may all be input parameters input and stored in the controller 98. As disclosed in Applicant's prior application, the desired spiral path 74 formed in the abrasive element 72 may be an Archimedean spiral, wherein the feed rate U is held substantially constant such that successive passes of the spiral path 74 are radially shifted by a substantially constant distance. The parameter D is the total distance of abrasive engagement between the ferrule assembly 68 and the abrasive element 72. According to Preston's equation, this distance is the primary driver for material removal from the interface 70 due to the abrading engagement. Lastly, while the abrading speed V is not part of the classic formulations for material removal, the speed is directly related to processing time, which is important for maximizing processing rates and throughput. To maintain consistency in the processing of the interface 70, the speed V may be held substantially constant during the traversal of the spiral path 74. Additional discussion and details relating to the Archimedean spiral and the processing parameters for forming such a spiral may be found in Applicant's prior application.

In any event, that discussion and analysis produced a set of equations for the spiral path 74 in polar coordinates (e.g., as a function of time):

$$r(t) = \sqrt{R_0^2 + \frac{UVt}{\pi}}, \tag{1}$$

$$\theta(t) = \frac{2\pi}{U}(r - R_0). \tag{2}$$

Of course, these coordinates may be converted to Cartesian coordinates through the well-known equations:

$$x = r \cos \theta; \, y = r \sin \theta. \tag{3}$$

These Cartesian coordinates may be stored in memory or computed during operation by the processor. Based on these Cartesian coordinates, the controller 98 may be configured to activate the motor drives 94, 96 to move the holding plate 92, and thus the abrasive element 72, to locations that correspond to the spiral path 74. The end result is a spiral path 74 in the abrasive element 72 having the following characteristics: (i) a starting position of $R_0$; (ii) an Archimedean spiral having a constant feed rate of U; (iii) movement along the spiral path occurs at a constant speed of V; and (iv) the spiral path ends at $R_1$ at which the total distance traveled along the spiral path is D. Moreover, the apparatus 78 provides that the interface 70 is processed substantially equally from every direction and the abrasive element is used in an efficient manner.

Figure 7A:
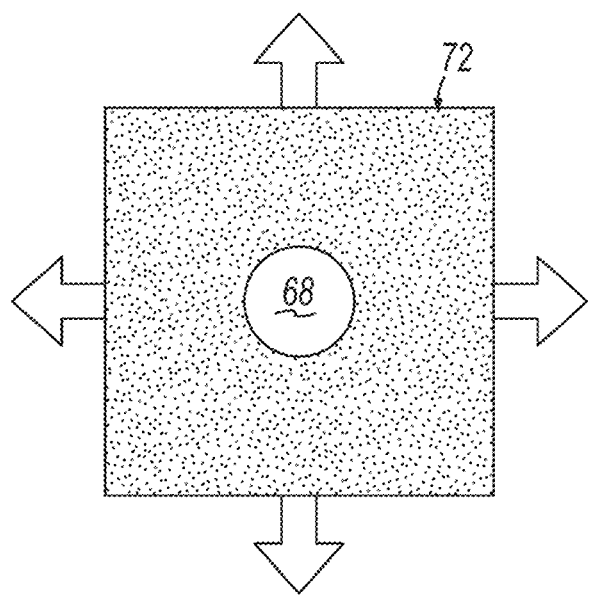
FIG. 7A is a schematic illustration representing the movement of the ferrule assembly and the abrasive element according to the apparatus shown in FIG. 6.
Figure 7B:
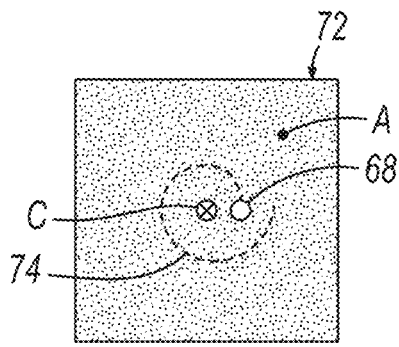
FIGS. 7B-7E are schematic illustrations showing the whole body movement of the abrasive element relative to the ferrule assembly.
Figure 7C:
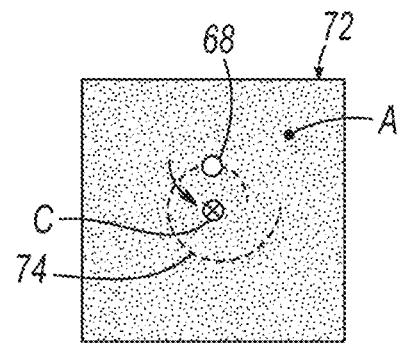
Figure 7D:
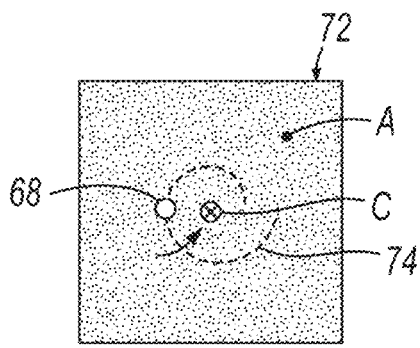
Figure 7E:
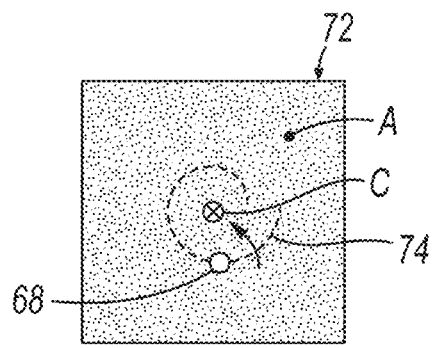

The arrangement described above is schematically illustrated in FIG. 7A. In this arrangement, the ferrule assembly 68 is held stationary and the abrasive element 72 is moved in a particular manner to produce the spiral path 74 in the abrasive element 72 that achieves the desired design criteria (e.g., polishes substantially equally from every direction and efficiently uses the abrasive element). As noted above, the apparatus 78 includes two degrees of freedom in the movement of the abrasive element 72 (e.g., the x-stage 86 and the y-stage 90) for processing the interface 70 of the ferrule assembly 68 with the abrasive element 72. In this embodiment, the movement of the abrasive element 72, i.e., its position and speed, are achieved through whole body movement of the abrasive element 72 about some point. There is, however, no rotation of the abrasive element 72 about, for example, a central axis of the abrasive element 72 itself. FIGS. 7B-7E schematically illustrate such "whole body" movement of the abrasive element 72 relative to the ferrule assembly 68 to provide the spiral path 74. In other words, any point A on the abrasive element 72 has a fixed position relative to its central axis C during the whole body movement of the abrasive element 72.

As discussed above, the movement of the abrasive element 72 as a whole body in order to effectuate speed and positional changes may be associated with considerable mass. Moreover, the movement of the relatively large mass may have certain limitations relating to the forces required to move the various components in the desired manner. In this regard, the motor drives 94, 96 generate forces sufficient to move the abrasive element 72 to the desired x-y positions within a plane to generate the spiral path 74. While the actual equation for force to move along a spiral path is complicated, certain simplifying assumptions may be made based on an order of magnitude analysis. In this regard, a close approximation to the force to move in a spiral may be provided by the mass multiplied by the centripetal acceleration (i.e., basically assuming that the force related to moving in a spiral is the same as the force to move in a circle at the given radius).

The centripetal acceleration scales with the inverse of the radius according to:

$$A(r) = \frac{V^2}{r}, \quad (4)$$

where V is the speed at the radius r. Accordingly, for large velocities or small radii, the forces required to move along the spiral path at a constant speed (as specified in the process above) may be very large. In many cases, the various motors in the apparatus are not capable to providing the necessary force at large speeds and/or small radii. Furthermore, the relatively large mass system may be subject to vibration and other disturbances at sufficiently high processing speeds (i.e., at a certain threshold speed, the system will start shaking). As noted above, various counterweight measures may be taken to obviate these disturbances to a certain extent. These measures, however, are expensive and provide limited effectiveness. Thus, while the apparatus 78 illustrated in FIG. 6 may be used to process ferrule assemblies 68 successfully, the apparatus may be subject to certain practical limitations in processing speeds.

Accordingly, for high throughput applications, a different solution is sought. To overcome the processing speed barrier described above, it may be desirable to move away from the large mass, whole body movement of the elements associated with the processing apparatus. Thus, the challenge is to generate relative abrading movement between the ferrule assembly 68 and the abrasive element 72 at high speeds and in a manner that minimizes vibrations and other disturbances that negatively impact the quality of the process. One approach is to first consider how to generate high abrading speeds V in a low-vibration manner. A solution contemplated in the present disclosure is to use a spinning system, such as a spindle for example. Various machining tools make use a spindle for rotating workpieces at very high angular velocities or frequencies (e.g., revolutions per minute or revolutions per second) without subjecting the workpieces and tooling to significant vibrations. Thus, one concept of the present disclosure is to make use of a rotating spindle for generating high abrading speeds with little vibrations.

Figure 8:
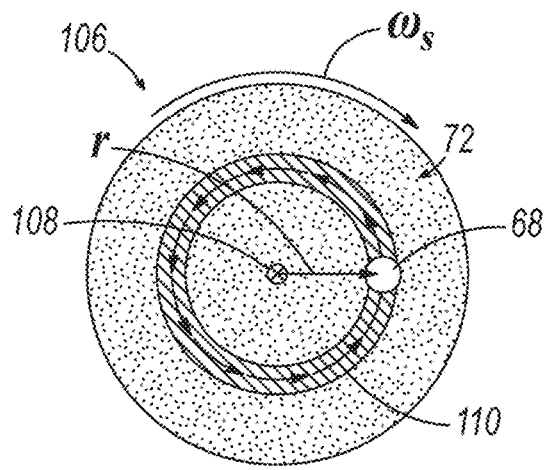
FIG. 8 schematically illustrates one arrangement for moving the ferrule assembly and abrasive element relative to each other using a spindle.

FIG. 8 schematically illustrates a spindle 106 having an abrasive element 72 disposed thereon and a fixed ferrule assembly 68. The spindle 106 (also referred to as "abrasive mount spindle") is rotating at an angular velocity of $\omega_s$ about a central axis 108. When the ferrule assembly 68 and the abrasive element 72 are brought into engaging contact with each other, an abrading velocity is generated in a direction perpendicular to the line that connects the central axis 108 and the ferrule assembly 68 and in the direction of rotation of the spindle 106. Of course, the abrading speed V is the product of the radial distance r between the ferrule assembly 68 and the central axis 108 and the angular velocity of the spindle 106, i.e., $V=\omega_s \cdot r$. Thus, at high angular velocities $\omega_s$, high abrading speeds V may be achieved. And since a spindle arrangement is being used, the high abrading velocities may be achieved without the generation of significant vibrations or other disturbances. However, as illustrated in FIG. 8, the abrading path 110 formed on the abrasive element 72 is in the shape of a circle. Accordingly, efficient use of the abrasive element 72 is missing from such an arrangement and the arrangement may have minimal value.

Figure 9:
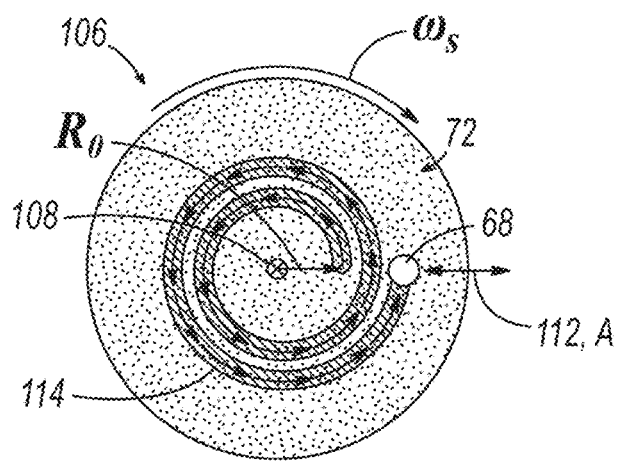
FIGS. 9 and 10 schematically illustrate arrangements for moving the ferrule assembly and abrasive element relative to each other using a spindle and a translation axis.
Figure 10:
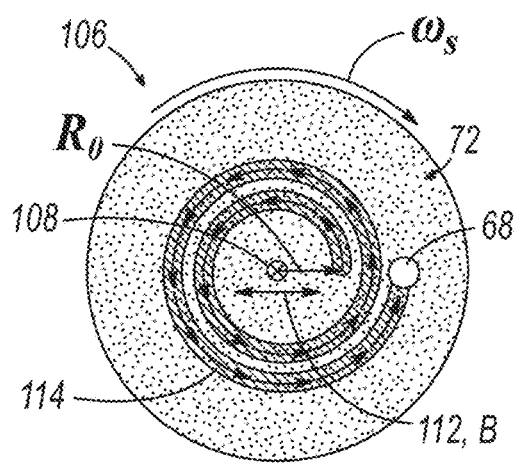

Based on the discussion above and Applicant's previous application, a spiral path is desired to make efficient use of the abrasive element 72. Thus, the challenge becomes forming a spiral path 74 in the abrasive element 72 while using the spindle configuration for generating abrading speeds without significant vibrations. FIGS. 9 and 10 schematically illustrate arrangements of polishing a ferrule assembly 68 with an abrasive element 72 that achieves these goals. In this regard, the spindle 106 having an abrasive element 72 disposed thereon is rotating at an angular velocity of $\omega_s$ about the central axis 108. The ferrule assembly 68 may be initially positioned at a radius of $R_0$ relative to the central axis 108 of the spindle 106. In addition to the rotation of the spindle 106, the system may be further configured to move the ferrule assembly 68 and the central axis 108 apart from each other along a translation axis 112. In one arrangement, the spindle 106 may be fixed and the ferrule assembly 68 may be moved along the translation axis 112 (FIG. 9) as demonstrated by arrow A. Alternatively, the ferrule assembly 68 may be fixed and the spindle 106 moved along the translation axis 112 (FIG. 10). In a further alternative embodiment (not shown), both the ferrule assembly 68 and the spindle 106 may move along the translation axis 112, such as toward each other or away from each other. Similar to the above, when the ferrule assembly 68 and the abrasive element 72 are brought into engaging contact with each other, an abrading velocity is generated in a direction perpendicular to the line that connects the central axis 108 and the ferrule assembly 68 and in the direction of rotation of the spindle 106.

In any event, because the translation axis 112 is oriented in the radial direction (relative to, for example, the ferrule assembly 68), and because there is movement along the translation axis 112, the resulting abrading path 114 is that of a spiral path 74. The distance between the ferrule assembly 68 and the central axis 108 of the spindle 106, which may be represented by r, may be provided by equation (1) above to produce an Archimedean spiral having a substantially constant feed rate U (speed along the translation axis 112) and a substantially constant abrading speed V along the spiral path 74. Similar to above, the abrading speed V is the product of the radial distance r from equation (1) and the angular velocity of the spindle 106, i.e., $V=\omega_s \cdot r$. Thus, as this distance between the ferrule assembly 68 and the central axis 108 increases (i.e., r increases), the angular velocity $\omega_s$ must decrease to maintain a constant abrading speed V.

In the arrangements of FIGS. 9 and 10, the abrading velocities are being produced from the rotation of the spindle 106 about its central axis 108, and thus is not susceptible to significant vibrations or other disturbances. Additionally, the relative movement of the ferrule assembly 68 and/or the central axis 108 along the translation axis 112 is also not very susceptible to vibrations, primarily due to this movement being along a single axis (i.e., one degree of freedom). Thus, high abrading speeds V may be achieved to produce a spiral trace path 74 on the abrasive element 72 (i.e., efficient use of the abrasive element 72) and without introducing significant vibrations or other disturbances into the system. The systems depicted by FIGS. 9 and 10 are similar to that of apparatus 78 in that it provides two degrees of freedom to effectuate polishing of the interface 70 of the ferrule assembly 68. In this regard, the rotation of the spindle 106 about its central axis 108 represents one degree of freedom and the movement of the ferrule assembly 68

(and/or the central axis 108) along the translation axis 112 represents the second degree of freedom.

While the arrangements illustrated in FIGS. 9 and 10 satisfy a number of the design criteria being sought, such as high abrading speeds without the associated vibrations and efficient use of the abrasive element, these arrangements fall short of satisfying certain other design criteria. For example, it should be realized that in the arrangements illustrated in FIGS. 9 and 10, the ferrule assembly 68 is not being polished substantially equally from every direction. In fact, in the arrangements illustrated in these figures, the ferrule assembly 68 is being polished by the abrasive element 72 in only a single direction, which as previously discussed may be undesirable for maintaining the intended geometry of the interface 70 of the ferrule assembly 68.

Figure 11:
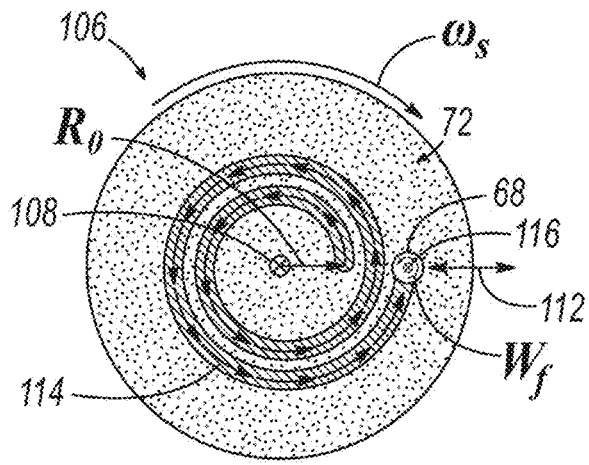
FIG. 11 schematically illustrates an arrangement for moving the ferrule assembly and abrasive element relative to each other using a pair of spindles and a translation axis.

Thus, the challenge becomes how to take the configuration illustrated in FIGS. 9 and 10 and modify that arrangement to ensure that there is substantially equal polishing from every direction. In one aspect of the present disclosure, the solution is to introduce yet another degree of freedom into the system such that there are three degrees of freedom of movement for processing the interface 70 of the ferrule assembly 68 using the abrasive element 72. FIG. 11 schematically illustrates an arrangement that incorporates the benefits of the arrangements shown in FIGS. 9 and 10, but also provides substantially equal polishing from every direction. In this regard and similar to the above, the spindle 106 having an abrasive element 72 disposed thereon is rotating at an angular velocity of $\omega_s$ about a central axis 108. The ferrule assembly 68 may be initially positioned at a radius of $R_0$ relative to the central axis 108 of the spindle 106. The system may be configured to move the ferrule assembly 68 and the central axis 108 apart from each other along a translation axis 112. Additionally, however, the ferrule assembly 68 may be configured to rotate about an axis 116 at an angular velocity $W_f$. For example, the ferrule assembly 68 may be operatively coupled to a second spindle (also referred to as a "ferrule mount spindle"; not shown) for rotating the ferrule assembly 68 about the axis 116 (also referred to as a "ferrule spindle axis" in such embodiments). The axis 116 in the embodiment shown corresponds a central axis of the ferrule assembly 68 and will be referred to as "central axis 116") below for convenience. Regardless of the terminology, this rotational movement of the ferrule assembly 68 may be achieved in a manner that does not significantly introduce vibrations or other disturbances into the system. Accordingly, the low-vibration operation of the arrangements in FIGS. 9 and 10 may be maintained even though a further degree of freedom (now three degrees of freedom) has been added to the system to ensure polishing of the ferrule assembly 68 substantially equally from every direction.

In the arrangement illustrated in FIG. 11, there is, in essence, a de-coupling between: i) the formation of a spiral path 74 at a high abrading speed and at low induced vibrations; and ii) the polishing of the ferrule assembly 68 substantially equally from every direction. In this regard, these two aspects may be achieved through separate and independently controllable processes. More particularly, aspect i) may be achieved through the use of spindle 106 rotating about central axis 108 (i.e., a low vibratory mode) and the relative movement between the ferrule assembly 68 and the central axis 108 along the translation axis 112 (i.e., to produce a spiral and use the abrasive element 72 efficiently). As noted above, this represents two degrees of freedom in the system, the first being the rotation of the spindle 106 about its central axis 108 and the second being the movement along the translation axis 112. The second aspect ii) may be achieved through the use of another spindle (i.e., the ferrule mount spindle referred to above) to which the ferrule assembly 68 may be operatively coupled so as to rotate about its central axis 116 (i.e., the ferrule spindle axis), and thus polish the ferrule assembly substantially equally from every direction. This represents the third degree of freedom to the system. The speed at which the ferrule assembly 68 is rotated $W_f$ may be controlled independently from the rotation of the spindle 106 and the relative movement along the translation axis 112. Additionally, since the rotation of the ferrule assembly 68 may be done using a spindle, this aspect may also be achieved without substantial vibrations introduced into the system. Thus, for example, while the spiral path 74 may have many passes, the number of times that the ferrule assembly 68 is rotated about its central axis 116 may be relatively few. For example, it is contemplated that the spiral path 74 may have fifty to a few hundred passes while the ferrule assembly 68 may make just a few revolutions about central axis 116, such as less than fifteen revolutions, less than ten revolutions, or even less than five revolutions. To this end, the angular velocity $\omega_s$ of the spindle 106 about the central axis 108 is expected to be greater, and in many instances much greater, than the angular velocity $W_f$ of the ferrule assembly 68 rotating about its central axis 116.

While the system illustrated in FIG. 11 meets the desired design criteria for processing the ferrule assembly 68, in some applications it may be undesirable to rotate the ferrule assembly 68 about its central axis 116. In this regard, the ferrule 12 may be fixedly secured to a long length of an optical fiber 16. While such a ferrule assembly may provide some flexibility in allowing rotation, there may be a practical limit to how many times the ferrule assembly 68 may be rotated about its axis 116 without, for example, breaking the fixed connection between the ferrule 12 and the optical fiber 16. Accordingly, it may be desirable to find an arrangement that provides all of the benefits of that discussed above in regard to FIG. 11 but does not rotate the ferrule assembly 68 about its central axis 116.

Figure 12:
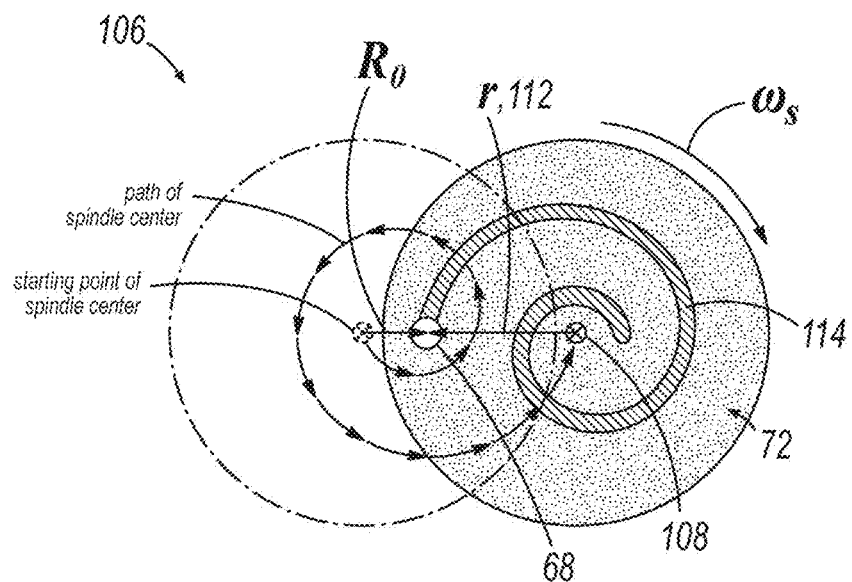
FIG. 12 schematically illustrates an arrangement for moving the ferrule assembly and abrasive element relative to each other using a spindle and a multi-axis frame.

In accordance with the present disclosure, an example of such an arrangement is schematically illustrated in FIG. 12. In this arrangement, the spindle 106 having the abrasive element 72 disposed thereon is rotated at an angular velocity of $\omega_s$ about its central axis 108 with the ferrule assembly 68 initially positioned at a radius of $R_0$ relative to the central axis 108 of the spindle 106. Similar to the above, the ferrule assembly 68 and the central axis 108 are configured to move relative to each other along translation axis 112 which in this arrangement is a radial axis. Furthermore, and in this particular arrangement, the central axis 108 of the spindle 106 (i.e., the spindle as a whole) is configured to revolve around (i.e., rotate about) the ferrule assembly 68, which may be fixed so as not to move within a plane (e.g., x-y plane) or rotate about its central axis 116. In other words, the spindle 106 is configured not only to rotate about its central axis 108 but is also configured to move within an x-y plane so as to revolve around the ferrule assembly 68. Similar to the arrangement illustrated in FIG. 11, the arrangement illustrated in FIG. 12 provides three degrees of freedom for processing the interface 70 of the ferrule assembly 68 using the abrasive element 72. In this regard, the rotation of the spindle 106 constitutes one degree of freedom of movement and the revolving of the central axis 108 of the spindle 106 around the ferrule assembly 68 within the x-y plane constitutes two degrees of freedom of movement for processing the interface 70 of the ferrule assembly 68.

Figure 13A:
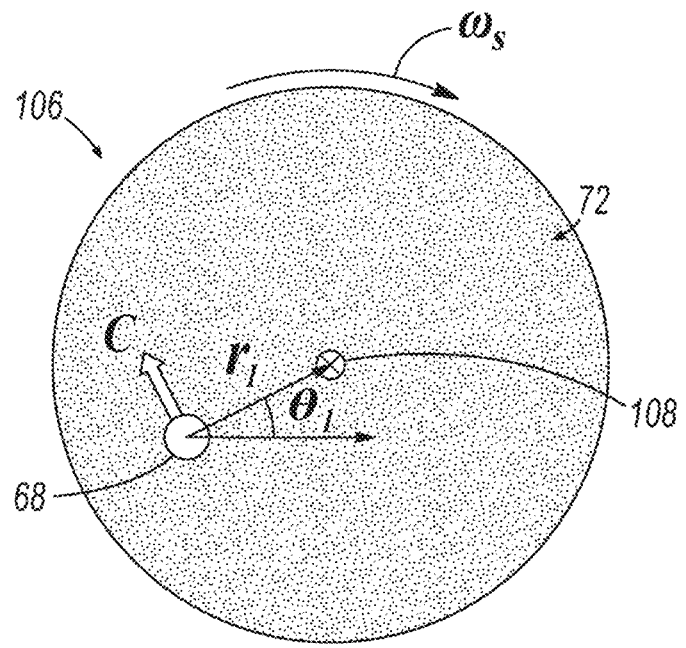
FIGS. 13A and 13B schematically illustrate polishing the ferrule assembly from every direction by rotating the spindle around the ferrule assembly.
Figure 13B:
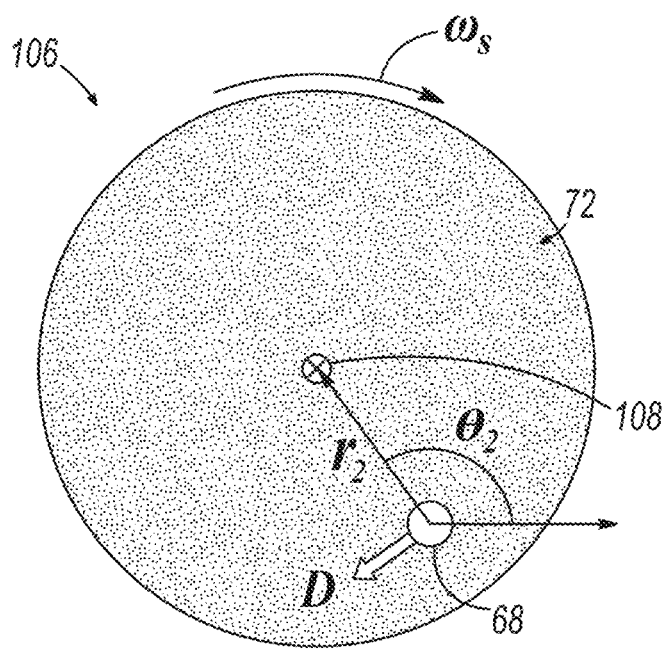

Similar to the above, the rotation of the spindle 106 about its central axis 108 and the coordinated movement between the ferrule assembly 68 and the central axis 108 of the spindle 106 (along radial translation axis 112) results in the formation of a spiral path 74 at a high abrading speed and low induced vibrations. The movement of the central axis 108 of the spindle 106 around the ferrule assembly 68 results in polishing the interface 70 of the ferrule assembly 68 substantially equally from every direction. To understand this latter aspect, reference is made to FIGS. 13A and 13B. In FIG. 13A, the central axis 108 of the spindle 106 is at a first position ($r_1$, $\theta_1$) and the abrading direction is indicated by arrow C (i.e., perpendicular to $r_1$ and in the direction of rotation of the spindle 106). In FIG. 13B, the central axis 108 of the spindle 106 has moved to a second position ($r_2$, $\theta_2$) due to its rotation around the ferrule assembly 68 and the abrading direction is indicated by arrow D (i.e., perpendicular to $r_2$ and in the direction of rotation of the spindle 106).

Because the ferrule assembly 68 is not rotating about its central axis 116, these figures demonstrate that as the central axis 108 of the spindle 106 revolves around the ferrule assembly 68, the ferrule assembly 68 is being polished substantially equally from every direction. More particularly, one revolution of the central axis 108 about the ferrule assembly 68 produces a direction of engagement (e.g., an abrading direction) between the interface 70 and the abrasive element 72 substantially equally from every circumferential direction (e.g., each angle in the full) 360°. Additional revolutions of the central axis 108 around the ferrule assembly 68 repeat the processing of the interface 70.

Thus, the arrangement illustrated in FIG. 12 is capable of satisfying the design criteria for the processing system, including formation of a spiral path 74 (see FIG. 5) of the abrasive element 72 at a high abrading speed (due to the rotation of the spindle 106 and relative distance between the ferrule assembly 68 and the central axis 108), and polishing the interface 70 of the ferrule assembly 68 substantially equally from every direction (due to the revolutions of the central axis 108 of the spindle 106 around the ferrule assembly 68). The arrangement further satisfies the design criteria of the ferrule assembly 68 not being rotated about its central axis 116, thus lessening the chances that the optical fiber 16 will become loosened from its connection to the ferrule 12. However, the design criteria of minimizing vibrations and other disturbances may warrant a further review.

In this regard, while the abrading speed generated from the rotation of the spindle 106 produces minimal vibrations, a question remains how the central axis 108 is going to be rotated about the ferrule assembly 68 within the x-y plane. In an exemplary embodiment, and as will be discussed in more detail below, the movement of the central axis 108 about the ferrule assembly 68 is not achieved using, for example, a low-vibration spindle, but is achieved by coordinated movement within the x-y plane using a multi-axis frame, for example, x and y-stages. To this end, the use of such x and y-stages for movement of the central axis 108 of the spindle 106 about the ferrule assembly 68 is similar to the apparatus 78 discussed above in reference to FIG. 6. It would somewhat follow that such a processing system might then be subject to the same vibration-induced limitations on processing rates and throughput as experienced by apparatus 78. That, however, may not necessarily be the case. The key to understanding this is realizing and appreciating the "de-coupling" between the generation of the spiral path (e.g., via the rotation of the spindle) and the movement of the central axis 108 around the ferrule assembly 68. This was discussed above in relation of FIG. 11. And similar to the arrangement in FIG. 11, it is expected that in the current embodiment the central axis 108 of the spindle 106 may only have to revolve around the ferrule assembly 68 a relatively small number of times (e.g., less than fifteen revolutions, less than ten revolutions, or possibly less than five revolutions). To this end, the angular velocity $\omega_s$ of the spindle 106 about the central axis 108 is expected to be greater, and in many instances much greater, than the angular velocity $\omega_c$ of the central axis 108 of the spindle 106 revolving around the ferrule assembly 68.

Figure 14:
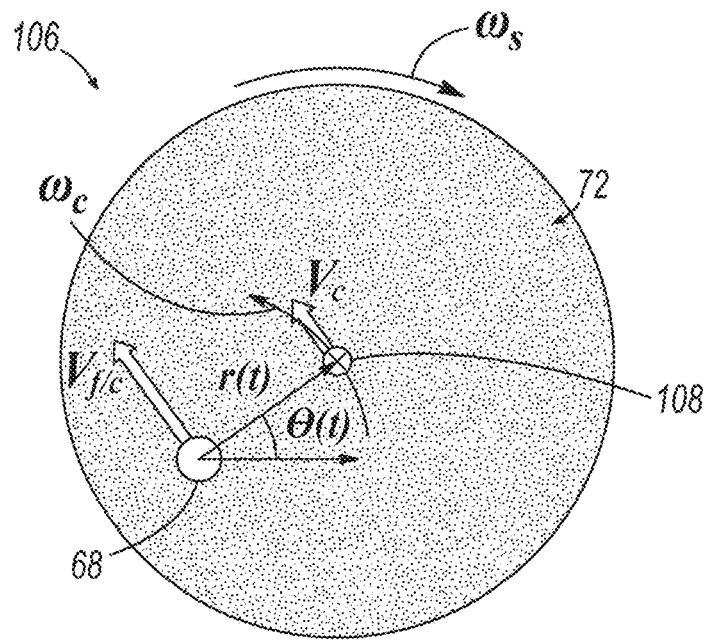
FIG. 14 schematically illustrate the relative speeds/velocities when the spindle is rotated around the ferrule assembly.

This concept may become clearer by examining the abrading speed V. In this figure, the spindle 106 carrying the abrasive element 72 is rotating about its central axis 108 at an angular velocity of $\omega_s$ and the central axis 108 is revolving around the ferrule assembly 68 at an angular velocity of $\omega_c$. Using the well-known laws of relative velocities $$V = V_c + V_{f/c}, \qquad (5)$$

where V is the abrading velocity at the ferrule assembly 68, $V_c$ is the velocity of the central axis 108, and $V_{f/c}$ is the velocity of the ferrule assembly 68 relative to the central axis 108. As illustrated in FIG. 14, the direction of revolution of the spindle 106 and the direction of revolution of the central axis 108 may be selected so that the velocity vectors point in the same direction and the speeds are additive. In this case, the result is that the abrading speed experienced by the ferrule assembly 68 is made up of two components. The first component $V_c$ is from the revolution of the central axis 108 about the ferrule assembly 68 and is given by $V_c = \omega_c \cdot r$. The second component $V_{f/c}$ is from the rotation of the spindle 106 about its central axis 108 and is given by $V_{f/c} = \omega_s \cdot r$. As can now be appreciated, $V_c$ is a vibration-inducing component and $V_{f/c}$ is a substantially non-vibration inducing component. Thus, so long as $V_c$ remains relatively small and $V_{f/c}$ is significantly larger than $V_c$, then it is possible to attain very high abrading speeds without inducing significant vibrations into the system. As noted above, this is expected to be the case since the number of revolutions that the central axis 108 makes around the ferrule assembly 68 is expected to be relatively small compared to, for example, the number of passes in the spiral path 74. In other words, most of the abrading speed V is being provided by the low-vibrating rotation of the spindle 106 about its central axis 108. A relatively small portion of the abrading speed is being provided by the vibration inducing movement of the central axis 108 of the spindle 106 about the ferrule assembly 68. As this portion of the abrading speed is expected to remain small, and under a threshold value for generating problematic vibrations, the system depicted in FIG. 12 is expected to satisfy the various design criteria, including not rotating the ferrule assembly 68.

Figure 15:
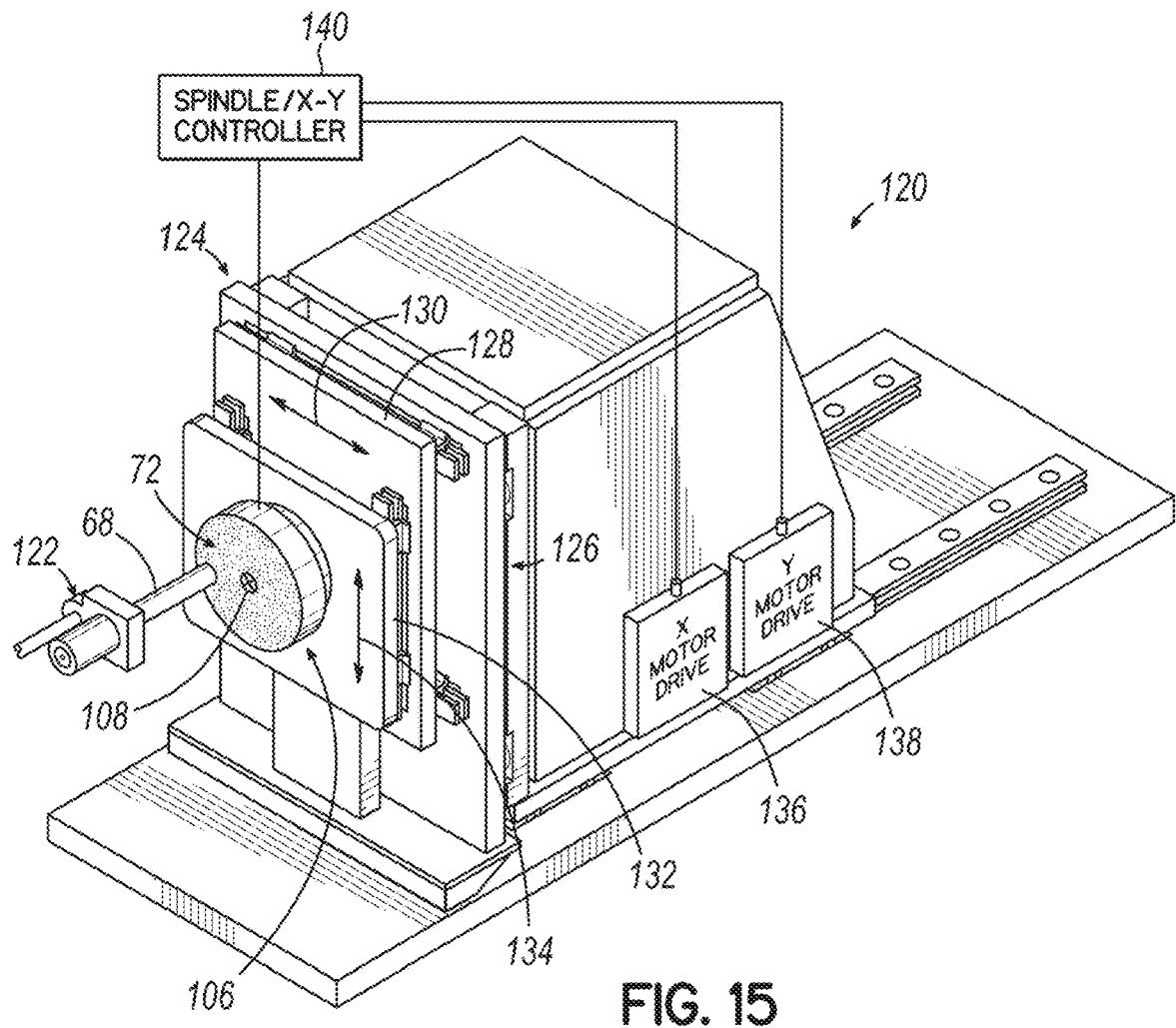
FIG. 15 schematically illustrates an apparatus for carrying out the arrangement shown in FIG. 12.

An apparatus 120 corresponding to the arrangement illustrated in FIG. 12 is shown in FIG. 15. The apparatus 120 can generate the relative movement between the ferrule assembly 68 and the abrasive element 72 to provide the spiral path 74. In the embodiment shown, the apparatus 120 is configured such that the ferrule assembly 68 is stationary while the abrasive element 72 is moved in an x-y plane to generate the spiral path 74. In this regard, the ferrule assembly 68 is secured to a first mount 122 and the abrasive element 72 is secured to a second mount 124. The second mount 124 is configured to be movable. In this regard, the second mount 124 includes a spindle 106 having an upper surface configured to receive the abrasive element 72, which may take the form of an abrasive sheet or film. The spindle 106 includes a motor or other actuator (not shown) for rotating the spindle about its central axis 108. The spindle 106 may be mounted to a multi-axis frame 126 having an x-stage 128 for moving the spindle 106 in a direction defined by an x-axis 130 and a y-stage 132 for moving the spindle 106 in a direction defined by a y-axis 134. The x-stage 128 includes a motor drive 136 for controlling an actuator (not shown) for moving the x-stage 128 along the x-axis 130 (i.e., in an x-direction). The y-stage 132 similarly includes a motor drive 138 for controlling an actuator for moving the y-stage 132 along the y-axis 134 (i.e., in a y-direction). The spindle 106 and the motor drives 136, 138 may be operatively coupled to a controller 140 for respectively controlling the rotational speed of the spindle 106 and the position of the abrasive element 72 relative to the ferrule assembly 68 within the x-y plane. The controller 140 may include a processor and a memory for storing data.

The controller 140 may further include an input interface configured to receive input from a technician or the like, for example, for carrying out the processing (e.g., polishing) of the interface 70 of the ferrule assembly 68 by the apparatus 120. By way of example, the starting radius $R_0$, radial feed rate U, distance D, and speed V may all be input parameters input and stored in the controller 120. As discussed above, the radial distance between the ferrule assembly 68 and the central axis 108 of the spindle 106 changes in time to generate the spiral path 74. That change is still governed by equation (1) provided above and represents the radial position of the central axis 108 relative to the ferrule assembly 68. However, equation (2) no longer governs the angular position of the central axis 108 of the spindle 106. Referring back to the de-coupling feature of this embodiment, it should be realized that the angular position is directed to the movement of the spindle 106 about the ferrule assembly 68. If the angular position is held fixed, then the apparatus is similar to the arrangement shown in FIG. 10, which does not substantially equally polish the interface 70 from every direction. Accordingly, to substantially equally polish the interface 70 of the ferrule assembly 68 from every direction, the angular position must change.

As discussed in Applicant's previous related application, from a processing standpoint, it may be desirable to keep the abrading speed V (an input parameter) constant during the polishing process. From equation (5) above, it is known that there are two components to the abrading speed V, the component $V_c$ due to the movement of the central axis 108 around the ferrule assembly 68 and the component $V_{f/c}$ due to the rotation of the spindle 106 about its central axis 108. In one embodiment, and for sake of simplicity in the dynamic system, the angular velocity $\omega_c$ at which the central axis 108 is rotated about ferrule assembly 68 may be held constant. In this regard, from a processing standpoint, it may be desirable to specify the number of times N that the central axis 108 is to be rotated about the ferrule assembly 68. This corresponds to, for example, the number of times that each direction is polished. Since the total abrading distance D is specified as an input parameter and the abrading speed V is specified as an input parameter, then the total time T of the process can be computed from standard equations as T=DN.

Moreover, since the number of times N that the central axis 108 is rotated about the ferrule assembly 68 is specified as an input parameter, then the rotational frequency $f_c$ of the central axis 108 about the ferrule assembly 68 may be computed from standard equations as $f_c$=N/T (i.e., number of revolutions in a set period of time). This parameter may be, for example, in revolutions per minute (rpm) or revolutions per second (rps). In any event the rotational frequency is related to the angular velocity by $\omega_c$=2π $f_c$ and remains constant. As is well known, the angular velocity $\omega_c$ of the central axis 108 about the ferrule assembly 68 is the time rate of change of the angular position θ that the central axis 108 makes relative to a reference frame (e.g., such as one taken at the ferrule assembly 68). Because the angular velocity $\omega_c$ is held constant, simple integration results in the following equation:

$$\theta(t)=\omega_c t=2\pi f_c t. \qquad (6)$$

Equation (1), which still controls the distance between the ferrule assembly 68 and the central axis 108 of the spindle 106 and equation (6) represent a set of equations that specify the position of the central axis 108 of the spindle 106 in polar coordinates. These coordinates may be converted to Cartesian coordinates through equation (3) and may be stored in memory or computed during operation by the processor. The controller 140 may be configured to activate the motor drives 136, 138 to move the spindle 106, and thus the abrasive element 72, to the desired locations relative to the ferrule assembly 68 in order to generate the spiral path 74 in the abrasive element 72.

Thus, to maintain the abrading speed V constant during the process and since the distance between the ferrule assembly 68 and the central axis 108 of the spindle 106 is changing, then from equation (5) above the component $V_{f/c}$ must also be variable and the controller 140 may be configured to control $V_{f/c}$ in order to maintain the abrading speed V constant. From equation (5) above we get the following equation:

$$V=\omega_c r(t)+\omega_{f/c} r(t) \qquad (7)$$

where $\omega_{f/c}$ is the angular velocity at the ferrule assembly 68 relative to the central axis 108. That variable is just the rotational velocity of the spindle $\omega_s$. Thus, rearranging this equation, we get the following for the angular frequency $f_s$ of the spindle 106:

$$f_s = \frac{V}{2\pi r(t)} - f_c. \qquad (8)$$

Thus, equation (8) dictates how to control the rotation of the spindle 106 in order to maintain a constant abrading velocity V during the process. With the input parameters in combination with equations (1), (6) and (8), the apparatus 120 is configured to process the ferrule assembly 68 using the abrasive element 72 in the manner described above.

Figure 16:
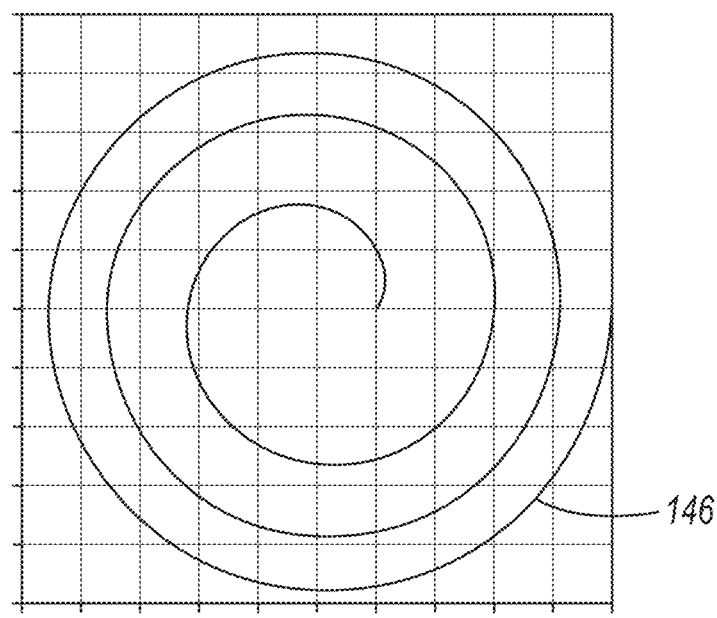
FIG. 16 schematically illustrates the path that the central axis of the spindle takes around the ferrule assembly when implemented by the apparatus shown in FIG. 15.
Figure 17:
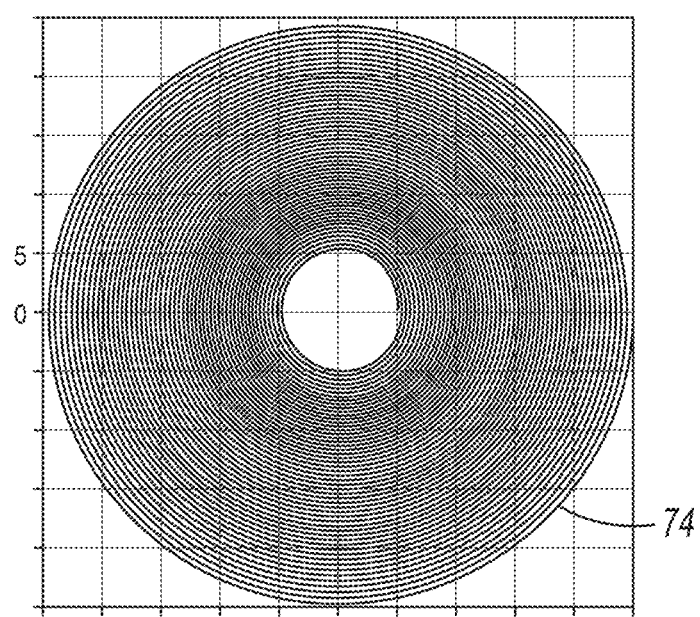
FIG. 17 schematically illustrates the spiral path traced in the abrasive element when implemented by the apparatus shown in FIG. 15.

FIGS. 16 and 17 are schematic illustrations of the movement of the central axis 108 of the of the spindle 106 about the ferrule assembly 68 and the resulting trace pattern on the abrasive element 72. As demonstrated in FIG. 16, the central axis 108 moves relative to the ferrule assembly 68 so as to form a spiral path 146. Additionally, the central axis 108 is illustrated as making relatively few revolutions around the ferrule assembly 68. As previously noted, in various embodiments, the central axis 108 of the spindle 106 may make fewer than 15 revolutions, fewer than 10 revolutions, or fewer than 5 revolutions about the ferrule assembly 68. Other values are also possible depending on the application. It is interesting to note that the spiral formed by the movement of the central axis 108 around the ferrule assembly 68 may not be an Archimedean spiral. Instead, the features of the spiral path 146 are dictated in a manner that forms an Archimedean spiral in the abrasive element 72. FIG. 17 illustrates the traced path in the abrasive element as a result of the processing implemented by apparatus 120 according to that above. Indeed, the spiral path 74 forms an Archimedean spiral on the abrasive element 72. As demonstrated by this figure, the resulting spiral has many passes as a result of the many revolutions of the spindle 106 about its central axis 108. In various embodiments, the number of passes in the Archimedean spiral will exceed the number of passes in the spiral shown in FIG. 16 by as much as twenty times, fifty time, or one hundred times.

It is also interesting to note that in the apparatus 120 shown in FIG. 15 and described above, if the rotation of the spindle 106 about its central axis 108 were shut off or deactivated, then the movement of the central axis 108 of the spindle 106 around the ferrule assembly 68 would be the sole movement available for processing the ferrule assembly 68 using the abrasive element 72. In other words, should the rotating of the spindle 106 be stopped, the apparatus 120 would essentially devolve into the apparatus 78 illustrated in FIG. 6, and one revolution of the central axis 108 of the spindle 106 around the ferrule assembly 68 would create one pass of the spiral path 74 traced on the abrasive element 72. This understanding and appreciation for FIGS. 16 and 17 demonstrate the significant advantages of using a rotating spindle to process the interface 70 of the ferrule assembly 68.

Figure 18:
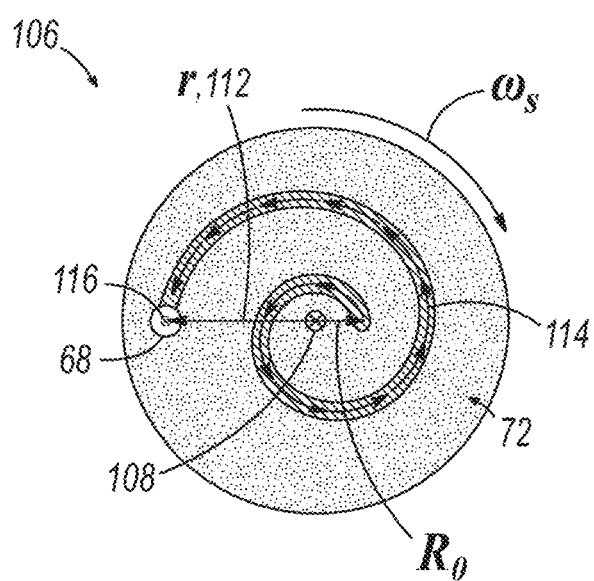
FIG. 18 schematically illustrates another arrangement for moving the ferrule assembly and abrasive element relative to each other using a spindle and a multi-axis frame.

FIG. 18 schematically illustrates yet another arrangement that is similar in operation to that of FIG. 12. In this arrangement, the spindle 106 having the abrasive element 72 disposed thereon is rotated at an angular velocity of $\omega_s$ about its central axis 108 with the ferrule assembly 68 initially positioned at a radius of $R_0$ relative to the central axis 108 of the spindle 106. Similar to the above, the ferrule assembly 68 and the central axis 108 of the spindle 106 are configured to move apart from each other along translation axis 112. Furthermore, and in this particular arrangement, the central axis 108 of the spindle 106 may be fixed so as not to move within a plane, and the central axis 116 of the ferrule assembly 68 may be configured to rotate about the central axis 108 of the spindle 106 (but without rotating about its central axis 116). In other words, the ferrule assembly 68 is configured to move within an x-y plane so as to revolve around the central axis 108 of the spindle 106. The rotation of the spindle 106 constitutes one degree of freedom of movement for processing the interface 70 of the ferrule assembly 68, and the revolving of the ferrule assembly 68 around the central axis 108 (but without rotation about its own axis) within the x-y plane constitutes two degrees of freedom of movement for processing the interface 70 of the ferrule assembly 68. Thus, the arrangement illustrated in FIG. 18 also provides three degrees of freedom of movement for processing the interface 70 of the ferrule assembly 68.

The rotation of the spindle 106 about its central axis 108 and the coordinated movement between the ferrule assembly 68 and the central axis 108 of the spindle 106 (along radial translation axis 112) results in the formation of a spiral path 74 at a high abrading speed and low induced vibrations. The movement of the central axis 116 of the ferrule assembly 68 around the central axis 108 of the spindle 106 results in polishing of the interface 70 of the ferrule assembly 68 substantially equally from every direction. The same rationale described for FIGS. 13A and 13B also explains how the rotation of the central axis 116 of the ferrule assembly 68 around the central axis 108 of the spindle 106 results in polishing of the interface 70 of the ferrule assembly 68 substantially equally from every direction and thus will not be explained in further detail. In any event, one revolution of the central axis 116 of the ferrule assembly 68 about the central axis 108 of the spindle 106 produces a direction of engagement (e.g., an abrading direction) between the interface 70 and the abrasive element 72 substantially equally from every circumferential direction (e.g., each angle in the full 360°). Additional revolutions of the central axis 116 around the central axis 108 of the spindle 106 repeat the processing of the interface 70.

Similar to the arrangement in FIG. 12, the arrangement illustrated in FIG. 18 is capable of satisfying the design criteria for the processing system, including formation of a spiral path 74 on the abrasive element 72 at a high abrading speed and polishing the interface 70 of the ferrule assembly 68 substantially equally from every direction. While the ferrule assembly 68 is revolved around the central axis 108 of the spindle 106 as, for example, a whole body, the arrangement further satisfies the design criteria of the ferrule assembly 68 not being rotated about its central axis 116, thus lessening the chances that the optical fiber 16 will become loosened from its connection to the ferrule 12.

In an exemplary embodiment, the movement of the central axis 116 of the ferrule assembly 68 about the central axis 108 of the spindle 106 may be achieved by coordinated movement within the x-y plane using a multi-axis frame, for example, x and y-stages. Similar to the arrangement of FIG. 12, this movement within the x-y plane might be subject to the same vibration-induced limitations on processing rates and throughput experienced by apparatus 120. Similar to the above, however, there is a de-coupling between the generation of the spiral path and the movement of the central axis 116 of the ferrule assembly 68 around the spindle 106. And similar to the arrangement in FIG. 12, it is expected that in the current embodiment the central axis 116 of the ferrule assembly 68 may only have to revolve around the central axis 108 of the spindle 106 a relatively small number of times (e.g., less than fifteen revolutions, less than ten revolutions, or possibly less than five revolutions). To this end, the angular velocity $\omega_s$ of the spindle 106 about the central axis 108 is expected to be greater, and in many instances much greater, than the angular velocity of the central axis 116 of the ferrule assembly 68 rotating around the spindle 106.

An apparatus for carrying out the arrangement of FIG. 18 would be similar to that shown in FIG. 15. The primary difference is that the multi-stage frame 126 would be associated with the first mount 122 in order to move the central axis 116 of the ferrule assembly 68 around the central axis 108 of the spindle 106. The governing equations and input parameters would be similar to that discussed above in reference to apparatus 120. Moreover, the expected path of the central axis 116 of the ferrule assembly 68 and the resulting spiral path 74 traced on the abrasive element would be similar to that shown in FIGS. 16 and 17, respectively.

Those skilled in the art will appreciate that other modifications and variations can be made without departing from the spirit or scope of the invention. For example, although the ferrule assemblies 68 are described above as being supported by respective connector bodies (e.g., the connector body 24 in FIG. 1) of fiber optic connectors during the processing, in alternative embodiments the ferrule assemblies may be processed before being assembled together with a respective connector body. Moreover, in some embodiments, the ferrule assemblies may not be intended for use in fiber optic connectors, but instead for other optical components, such as attenuators, optical couplers, isolators, collimators, filters, switches, wavelength division multiplexing (WDM) modules, etc. Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. An apparatus for processing a ferrule with an abrasive element, the apparatus comprising:
a first mount to which the ferrule is configured to be secured;
a second mount to which the abrasive element is configured to be secured;
and a controller operatively coupled to at least the second mount,
wherein the second mount includes an abrasive mount spindle to which the abrasive element is configured to be coupled, and the abrasive mount spindle has a central axis about which the abrasive mount spindle is configured to rotate,
wherein at least one of the first or second mounts is movable within a plane defined by at least one of the first or second mounts such that when the ferrule and the abrasive element are brought into contact with each other, the apparatus provides three degrees of freedom of movement for processing the ferrule with the abrasive element;
wherein the second mount includes a frame movable in at least two directions, wherein the abrasive mount spindle is mounted to the frame, and wherein the controller is configured to move the abrasive mount spindle within the plane;
and wherein the controller is configured to actuate the frame in a manner that causes the abrasive mount spindle to revolve around the ferrule during operation of the apparatus.

2. The apparatus of claim 1, wherein the first mount is stationary and the second mount provides the three degrees of freedom of movement for processing the ferrule with the abrasive element.

3. The apparatus of claim 1, wherein the controller is configured to actuate the frame so that the abrasive mount spindle revolves around the ferrule in a spiral path.

4. The apparatus of claim 1, wherein the frame comprises an x-stage for moving the abrasive mount spindle in an x-direction and a y-stage for moving the abrasive mount spindle in a y-direction.

5. The apparatus of claim 1, wherein the controller is configured to rotate the abrasive mount spindle about the central axis at an angular velocity greater than an angular velocity at which the abrasive mount spindle revolves around the ferrule.

6. The apparatus of claim 1, wherein the first mount is movable relative to the second mount and provides at least one degree of freedom of movement for processing the ferrule with the abrasive element.

7. The apparatus of claim 6, wherein the first mount comprises a ferrule spindle to which the ferrule is configured to be coupled, the ferrule spindle having a ferrule spindle axis about which the ferrule spindle is configured to rotate.

8. The apparatus of claim 7, wherein the controller is configured to rotate the abrasive mount spindle about the central axis at an angular velocity greater than an angular velocity at which ferrule spindle rotates about the ferrule spindle axis.

9. The apparatus of claim 6, wherein the second mount comprises a frame movable along a translation axis, and wherein the controller is configured to move the abrasive element along the translation axis.

10. The apparatus of claim 6, wherein the first mount provides at least two degrees of freedom of movement for processing the ferrule with the abrasive element.

11. The apparatus of claim 10, wherein the first mount comprises a frame movable in at least two directions, and wherein the controller is operatively coupled to the frame and configured to move the ferrule within the plane.

12. The apparatus of claim 7, wherein the first mount provides at least two degrees of freedom of movement for processing the ferrule with the abrasive element and includes a frame movable along a translation axis, wherein the controller is operatively coupled to the frame and configured to move the ferrule within the plane along the translation axis.

13. The apparatus of claim 1, wherein the controller is configured to cause relative movement between the first mount and second mount such that engagement of the ferrule with the abrasive element during the relative movement traces a spiral path in the abrasive element.

14. The apparatus of claim 13, wherein the spiral path defines an Archimedean spiral.

15. The apparatus of claim 1, wherein a ferrule assembly comprises the ferrule and at least one optical fiber coupled to the ferrule, and wherein the apparatus is configured for processing the ferrule assembly with the abrasive element.

* * * * *